(12) United States Patent
Smee et al.

(10) Patent No.: US 7,342,952 B2
(45) Date of Patent: Mar. 11, 2008

(54) SLICER INPUT AND FEEDBACK FILTER CONTENTS FOR BLOCK CODED DIGITAL COMMUNICATIONS

(75) Inventors: John E. Smee, San Diego, CA (US); Haitao Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 411 days.

(21) Appl. No.: 10/602,508

(22) Filed: Jun. 24, 2003

(65) Prior Publication Data

US 2004/0264552 A1 Dec. 30, 2004

(51) Int. Cl.
*H04B 1/00* (2006.01)

(52) U.S. Cl. .................. 375/148; 375/150; 375/348; 375/350; 375/233

(58) Field of Classification Search .............. 375/130, 375/140, 142, 144, 143, 148, 150, 152, 229, 375/233, 232, 231, 285, 346, 348, 350
See application file for complete search history.

(56) References Cited

U.S. PATENT DOCUMENTS

| | | | | |
|---|---|---|---|---|
| 6,012,161 | A * | 1/2000 | Ariyavisitakul et al. | 714/795 |
| 6,233,273 | B1 * | 5/2001 | Webster et al. | 375/148 |
| 6,603,801 | B1 * | 8/2003 | Andren et al. | 375/147 |
| 6,614,836 | B1 * | 9/2003 | Halford et al. | 375/152 |
| 6,647,077 | B1 * | 11/2003 | Shan et al. | 375/346 |
| 6,661,857 | B1 * | 12/2003 | Webster et al. | 375/350 |
| 6,678,310 | B1 * | 1/2004 | Andren et al. | 375/147 |
| 6,690,715 | B2 * | 2/2004 | Webster et al. | 375/148 |
| 6,700,929 | B1 * | 3/2004 | Shan et al. | 375/224 |
| 6,728,324 | B1 * | 4/2004 | Shan et al. | 375/346 |
| 6,990,158 | B2 * | 1/2006 | Shan et al. | 375/346 |
| 7,027,538 | B2 * | 4/2006 | Ghosh | 375/350 |
| 2003/0053527 | A1 * | 3/2003 | Brunel | 375/148 |
| 2003/0152176 | A1 * | 8/2003 | Ghosh | 375/350 |
| 2004/0037380 | A1 * | 2/2004 | Shan | 375/346 |
| 2004/0131109 | A1 * | 7/2004 | Kim et al. | 375/148 |
| 2004/0146129 | A1 * | 7/2004 | Lin | 375/348 |
| 2004/0196933 | A1 * | 10/2004 | Shan et al. | 375/346 |
| 2004/0240538 | A1 * | 12/2004 | Abrishamkar et al. | 375/233 |

* cited by examiner

*Primary Examiner*—Jean B. Corrielus
(74) *Attorney, Agent, or Firm*—Howard Seo; Peng Zhu; Thomas R. Rouse

(57) ABSTRACT

Improved decision directed adaptation and decision feedback equalizers are provided in a block coded digital communication system. The performance of a receiver is significantly improved by allowing the decision feedback equalizer to perform time-tracking and residual frequency offset compensation during the data portion of a frame. This is accomplished by capitalizing on the inherent correlation among the chips of a code word in a block coded digital communication system to identify certain instances where more reliable symbol estimates can be derived from a sliced chip without introduction the delay inherent in decoding. As the more reliable symbol estimates are fed back into the chip slicer, the total efficiency of the decision feedback equalizer is improved and the more reliable symbol estimates can be used to replace older content in the feedback filter to further improve the accuracy of the modified slicer input and further decrease the effects of error propagation by the decision feedback equalizer.

23 Claims, 6 Drawing Sheets

| content of FBF tap 9 | content of FBF tap 8 | content of FBF tap 7 | content of FBF tap 6 | content of FBF tap 5 | content of FBF tap 4 | content of FBF tap 3 | content of FBF tap 2 | content of FBF tap 1 | slicer input at time (n) | CCK chip Index (k) | frame chip Index (n) |
|---|---|---|---|---|---|---|---|---|---|---|---|
| | | | | | | | | | 1 | 1 | 1 |
| | | | | | | | | 1 | 2 | 2 | 2 |
| | | | | | | | 1 | 2 | 3with1 | 3 | 3 |
| | | | | | | 1from3 | 2 | 3with1 | 4with2 | 4 | 4 |
| | | | | | 1from3 | 2from4 | 3with1 | 4with2 | 5 | 5 | 5 |
| | | | | 1from3 | 2from4 | 3with1 | 4with2 | 5 | 6 | 6 | 6 |
| | | | 1from3 | 2from4 | 3with1 | 4with2 | 5 | 6 | 7with5 | 7 | 7 |
| | | 1from3 | 2from4 | 3with1 | 4with2 | 5from7 | 6 | 7with5 | 8with6 | 8 | 8 |
| | 1from3 | 2from4 | 3with1 | 4with2 | 5from7 | 6from8 | 7with5 | 8with6 | 9 | 1 | 9 |
| 1from3 | 2from4 | 3with1 | 4with2 | 5from7 | 6from8 | 7with5 | 8with6 | 9 | 10 | 2 | 10 |
| 2from4 | 3with1 | 4with2 | 5from7 | 6from8 | 7with5 | 8with6 | 9 | 10 | 11with9 | 3 | 11 |
| 3with1 | 4with2 | 5from7 | 6from8 | 7with5 | 8with6 | 9from11 | 10 | 11with9 | 12with10 | 4 | 12 |
| 4with2 | 5from7 | 6from8 | 7with5 | 8with6 | 9from11 | 10from12 | 11with9 | 12with10 | 13 | 5 | 13 |
| 5from7 | 6from8 | 7with5 | 8with6 | 9from11 | 10from12 | 11with9 | 12with10 | 13 | 14 | 6 | 14 |
| 6from8 | 7with5 | 8with6 | 9from11 | 10from12 | 11with9 | 12with10 | 13 | 14 | 15with13 | 7 | 15 |
| 7with5 | 8with6 | 9from11 | 10from12 | 11with9 | 12with10 | 13from15 | 14 | 15with13 | 16with14 | 8 | 16 |
| 8with6 | 9from11 | 10from12 | 11with9 | 12with10 | 13from15 | 14from16 | 15with13 | 16with14 | 17 | 1 | 17 |
| 9from11 | 10from12 | 11with9 | 12with10 | 13from15 | 14from16 | 15with13 | 16with14 | 17 | 18 | 2 | 18 |
| 10from12 | 11with9 | 12with10 | 13from15 | 14from16 | 15with13 | 16with14 | 17 | 18 | 19with17 | 3 | 19 |
| 11with9 | 12with10 | 13from15 | 14from16 | 15with13 | 16with14 | 17from19 | 18 | 19with17 | 20with18 | 4 | 20 |
| 12with10 | 13from15 | 14from16 | 15with13 | 16with14 | 17from19 | 18from20 | 19with17 | 20with18 | 21 | 5 | 21 |

FIG. 5

```
%%add new section to do 5.5M slicing based on CCK codeword knowledge (1=3, 2=-4, 5=-7, 6=8)
if MPDU_RATE= =5.5 & kk= =3
    slicer_output=hard_decision(real(chipCx1_estimate_vec(kk)+chipCx1_estimate_vec(kk-2)), ...
    imag(chipCx1_estimate_vec(kk)+chipCx1_estimate_vec(kk-2)));
elseif MPDU_RATE= = 5.5 & kk= =4
    slicer_output=hard_decision(real(chipCx1_estimate_vec(kk)-chipCx1_estimate_vec(kk-2)), ...
    imag(chipCx1_estimate_vec(kk)-chipCx1_estimate_vec(kk-2)));
elseif MPDU_RATE= = 5.5 & kk= =7
    slicer_output=hard_decision(real(chipCx1_estimate_vec(kk)-chipCx1_estimate_vec(kk-2)), ...
    imag(chipCx1_estimate_vec(kk)-chipCx1_estimate_vec(kk-2)));
elseif MPDU_RATE= = 5.5 & kk= =8
    slicer_output=hard_decision(real(chipCx1_estimate_vec(kk)+chipCx1_estimate_vec(kk-2)), ...
    imag(chipCx1_estimate_vec(kk)+chipCx1_estimate_vec(kk-2)));
end
```

FIG. 6A

```
If (kk= =3 | kk = = 4 | kk= =7 | kk = = 8) % use slicer output for improved DD-LMS on FFF
    FFF = FFF +LMS_stepsize*(FFF_content_I_Cx2+j*FFF_contentQ_Cx2)
*conj(train_scale*slicer_output-chipCx1_estimate_vec(kk));

If (kk= =3 | kk = = 4 | kk= =7 | kk = = 8) % use slicer output for improved DD-LMS on FBF
    FBF = FBF +LMS_stepsize*(FBF_content1_Cx1+j*FBF_contentQ_Cx1)
*conj(train_scale*slicer_output-chipCx1_estimate_vec(kk))
```

FIG. 6B

```
FBF_contentI_Cx1 = [FBF_input_scale*real(slicer_output); FBF_contentI_Cx1 (1:end-1)];
FBF_contentQ_Cx1 = [FBF_input_scale*imag(slicer_output);FBF_contentQ_Cx1(1:end-1)];

%% Add Section to modify FBF contents based on more accurate sliced value. (i.e. on chips 3, 4, 7, 8
%% we have better information on the FBF contents that are 2 chips old, so we replace FBF(3) with the
%% appropriately signed version of FBF(1))

if kk = = 3
        FBF_content1_Cx1(3)=FBF_contentI_Cx1(1);
        FBF_contentQ_Cx1(3)=FBF_contentQ_Cx1(1);
elseif kk = = 4
        FBF_content1_Cx1(3)=-FBF_contentI_Cx1(1);
        FBF_contentQ_Cx1(3)=-FBF_contentQ_Cx1(1);
elseif kk = = 7
        FBF_content1_Cx1(3)=-FBF_contentI_Cx1(1);
        FBF_contentQ_Cx1(3)=-FBF_contentQ_Cx1(1);
elseif kk = = 8
        FBF_content1_Cx1(3)=FBF_contentI_Cx1(1);
        FBF_contentQ_Cx1(3)=FBF_contentQ_Cx1(1);
end
```

FIG. 6C

SLICER INPUT AND FEEDBACK FILTER CONTENTS FOR BLOCK CODED DIGITAL COMMUNICATIONS

BACKGROUND

1. Field of the Invention

The present invention relates generally to the field of wireless communications and more particularly relates to block coded digital communication systems.

2. Related Art

Conventional block coded digital communication systems typically split a frame into known training symbols and known data symbols. Although the symbols are known, i.e., included in a predefined finite alphabet, the particular data symbols in any given frame are unknown to the receiver.

During the training portion of a frame, it is well known to run tracking loops based on an error signal generated from the training data. For example, a time tracking loop or phase locked loop may be employed. Alternatively, or in combination, a least mean square ("LMS") equalizer updating procedure may also be used. These loops or procedures serve to provide critical information to the receiver of a wireless communication device.

In these conventional block coded digital communication systems, it is often necessary to continue adapting the loops during the data portion of the frame, for example to compensate for a fading signal or timing error. A common method of such continuous adaptation is to employ decision-directed ("DD") adaptation. This scheme requires that the receiver estimate what symbols are received in the data stream. Typically, a slicer is employed to obtain tentative decisions for the transmitted data symbols and to determine the noise associated with the slicer decision. The final decisions for the transmitted data symbols are based on the decoder output.

A problem associated with this scheme is the delay that is inherent in channel decoding. Because the symbols are encoded, the efficiency of the process is either reduced by decoding the symbols or reduced by the higher error rate that is inherent with slicer decisions as opposed to decisions from the decoder output.

Furthermore, implementing a decision feedback equalizer ("DFE") at the receiver to remove intersymbol interference ("ISI") exacerbates this problem because the input to the feedback filter ("FBF") comprises the higher error rate slicer decisions. Thus, when the sliced symbols that are put into the FBF are in error, which is more likely when they are encoded, then the DFE propagates the error and increases the likelihood of subsequent slicer errors and thereby diminishes performance. FIG. 1 is an example graph diagram illustrating conventional slicer errors when unmodified symbol estimates are used as slicer input.

Therefore, what is needed is a method for improving slicer input and the corresponding feedback filter contents in block coded communications to overcome these significant problems found in the conventional systems as described above.

SUMMARY

Methods for improved decision directed adaptation and decision feedback equalizers are presented. In a block coded digital communication system the performance of a receiver is significantly improved by allowing decision directed adaptation through a decision feedback equalizer to perform time-tracking and residual frequency offset compensation during the data portion of a frame. Additionally, DFE error propagation is decreased by modifying the contents of the feedback filter to include more reliable symbol estimates.

As an encoded stream of symbols is received in a block coded digital communication system, a slicer is employed by a decision feedback equalizer to slice chips of a code word from the encoded stream and pass them to a feedback filter. Based on the inherent correlation among the chips of a code word, certain instances of more reliable symbol estimates are derived from the sliced chips.

As the more reliable symbol estimates are fed back into the chip slicer, the total efficiency of the decision feedback equalizer is improved. Moreover, the more reliable symbol estimates are used to replace older content in the feedback filter to further improve the accuracy of the modified slicer input and decrease the effects of DFE error propagation.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 is a table diagram illustrating improved feedback filter contents according to an embodiment of the present invention;

FIG. 6A is an example pseudo code listing for creating more accurate sliced chips for least mean square and feed back filter tracking according to an embodiment of the present invention;

FIG. 6B is an example pseudo code listing for using more accurate sliced chips for better least mean square updating of a decision feedback equalizer, feed forward filter, and feed back filter according to an embodiment of the present invention; and FIG. 6C is an example pseudo code listing for using the more accurate sliced chips for improved feed back filter contents according to an embodiment of the present invention.

DETAILED DESCRIPTION

Certain embodiments as disclosed herein provide for improved decision directed adaptation employed by a receiver in a block coded digital communication system. For example, one method as disclosed herein allows for the inherent correlation between the chips of a code word to be exploited to derive more reliable symbol estimates. These more reliable symbol estimates are then passed through a feedback filter to improve the accuracy of future input to the chip slicer. Additionally, the more reliable symbol estimates replace earlier symbol estimates in a feedback filter to further improve the total efficiency of the decision feedback equalizer.

After reading this description it will become apparent to one skilled in the art how to implement the invention in various alternative embodiments and alternative applications. However, although various embodiments of the present invention will be described herein, it is understood that these embodiments are presented by way of example only, and not limitation. As such, this detailed description of various alternative embodiments should not be construed to limit the scope or breadth of the present invention as set forth in the appended claims.

Figure 1:
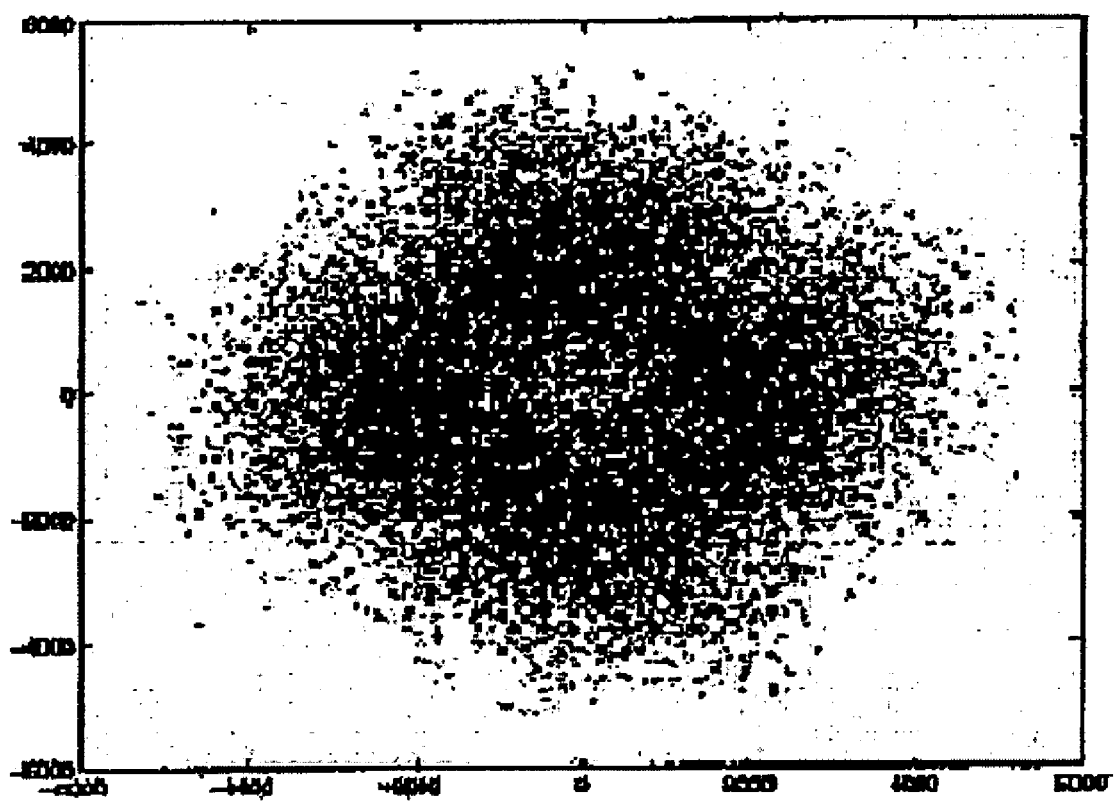
FIG. 1 is an example graph diagram illustrating conventional slicer errors when unmodified symbol estimates are used as slicer input.
Figure 2:
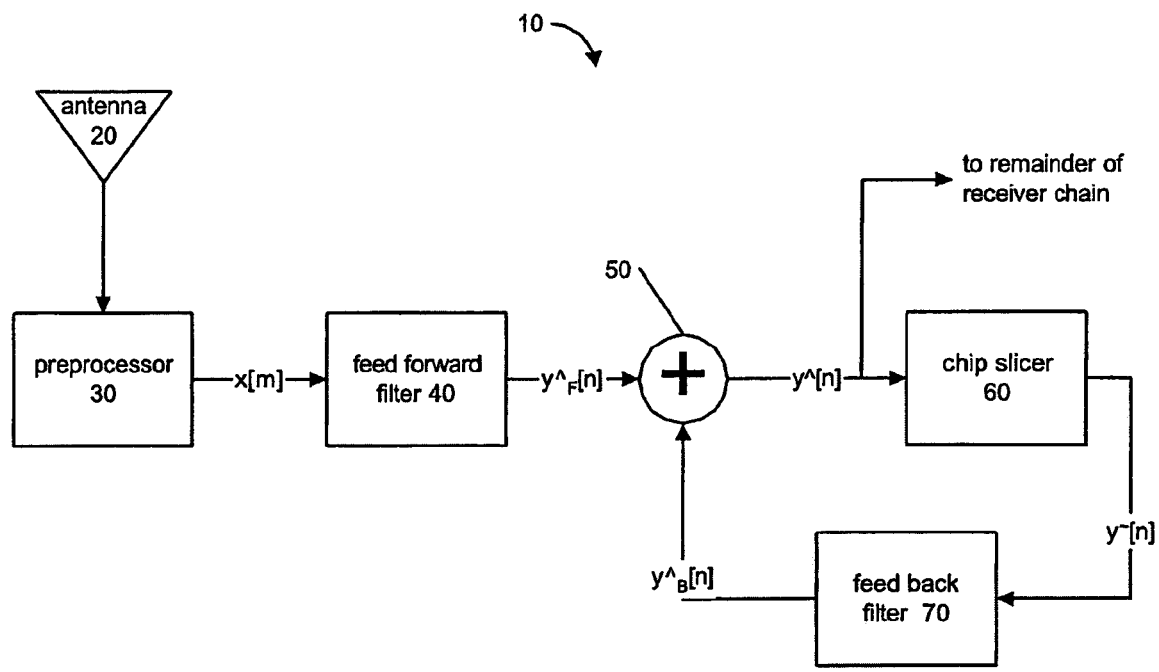
FIG. 2 is a block diagram illustrating an example decision feedback equalizer according to an embodiment of the present invention.

FIG. 2 is a block diagram illustrating an example decision feedback equalizer ("DFE") 10 according to an embodiment of the present invention. In the illustrated embodiment, the DFE 10 comprises an antenna 20, a preprocessor 30, a feed forward filter 40, a chip combiner 50, a chip slicer 60, and a feed back filter 70.

The antenna 20 can be any of a variety of antennas configured for wireless communications in a block coded digital communication system, as will be understood by one having skill in the art. Similarly, the preprocessor 30 preferably carries out signal processing tasks and provides the feed forward filter 40 with baseband samples (i.e., digital input), as will also be understood by one having skill in the art. The feed forward filter 40 preferably processes the baseband samples and sends the digital data stream to the chip slicer 60, in combination with any signal added or subtracted by the chip combiner 50. In one embodiment, the feed back filter 70 can be a finite impulse response ("FIR") filter that processes the previous slicer 60 outputs to subtract out postcursor inter symbol interference ("ISI") from the current input to the slicer 60.

In one embodiment, the length of the feedback filter 70 is not related to the length of the codewords. For example, the coefficients for the feed forward filter 40 and the feedback filter 70 can be selected based on the minimum mean square error ("MMSE") criterion using either adaptive techniques or based on computations involving a channel estimate.

The chip slicer 60 is preferably configured to extract a portion of the data stream that corresponds to a single chip of a code word. Each sliced chip is preferably provided to the feed back filter 70, where the sliced chips are processed to determine any noise associated with the slicer decision. The feed back filter 70 advantageously feeds the noise component back into the chip slicer 60 by way of the chip combiner 50. In this fashion, the noise component can be subtracted from next incoming signal from the feed forward filter 40 before it is fed into the slicer 60.

For example, in block coded digital communications, a stream of digital data is sent over the airwaves in analog form and received by the antenna 20. The analog waves are interpreted by the preprocessor 30 and converted to digital form. The digital signal comprises a frame that is divided into two portions, a training portion and a data portion. Within the data portion of the frame are a series of binary digits (i.e., ones and zeroes) that are encoded symbols which represent the data payload. These symbols can be broken down into a plurality of code words and each code word can be further broken down into a plurality of chips. For example, a complementary code keying ("CCK") code word, as specified for the IEEE 802.11b 5.5 Mb/s data rate, is eight (8) chips long.

When an encoded symbol is sent to the chip slicer 60, the chip slicer 60 preferably identifies a subset of the symbol that represents a single chip. The correct identification of a chip is very important because if a chip is not correctly identified, then DFE error propagation will result, where the incorrectly sliced chips fed into the feedback filter 70 can result in an output from the feedback filter 70 that incorrectly accounts for interference and therefore causes further errors in slicer decisions made by the chip slicer 60.

Thus, in the training portion of the frame, it is well known to provide information relating to the identification of chips. However, when signal strength fades, for example, the information provided in the training portion of the frame may become obsolete during processing of the data portion of the frame. To account for such variations in the signal during the data portion of the frame, the chip slicer 60 sends the sliced chips to the feed back filter 70 in order to more accurately slice the next incoming chip.

Advantageously, the construction of code words introduces a certain correlation between the various chips that comprise a code word. For example, a CCK code word is eight (8) chips long and includes the following structure:

CCKchip(3)=CCKchip(1)
CCKchip(4)=−CCKchip(2)
CCKchip(5)=−CCKchip(7)
CCKchip(6)=CCKchip(8)

Knowledge of this structure allows the use of decision directed adaptation during the data portion of the frame in order to continuously calibrate the slicing of chips by the chip slicer 60. Thus, the symbol estimates created by the chip slicer 60 can be improved in fifty percent (50%) of the estimates according to:

Improved_Estimate(3)=Estimate(3)+Estimate(1)
Improved_Estimate(4)=Estimate(4)−Estimate(2)
Improved_Estimate(7)=Estimate(7)−Estimate(5)
Improved_Estimate(8)=Estimate(8)+Estimate(6)

Figure 3:
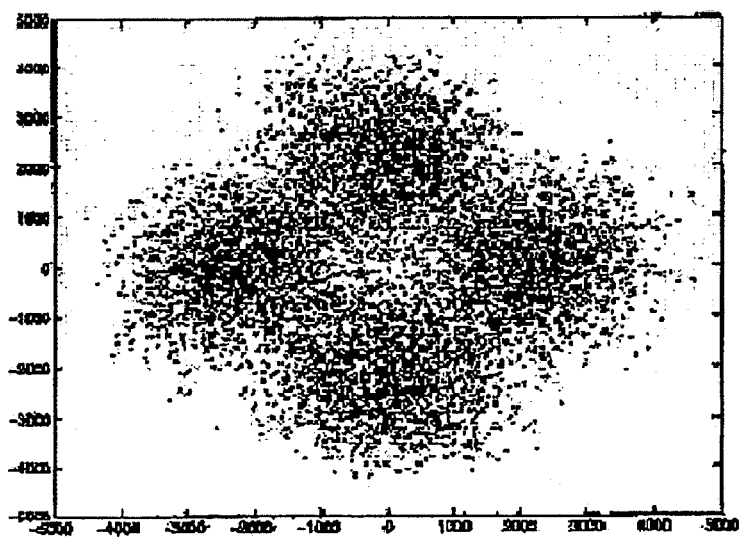
FIG. 3 is an example graph diagram illustrating a reduced amount of slicer errors based on modified symbol estimates according to an embodiment of the present invention.

With the improved estimates from the slicer 60, an improved noise component can be fed back into the slicer 60 fifty percent (50%) of the time, resulting in significantly improved results and decreased DFE error propagation. Accordingly, FIG. 3 is an example graph diagram illustrating a reduced amount of slicer errors based on improved symbol estimates according to an embodiment of the present invention.

Figure 4:
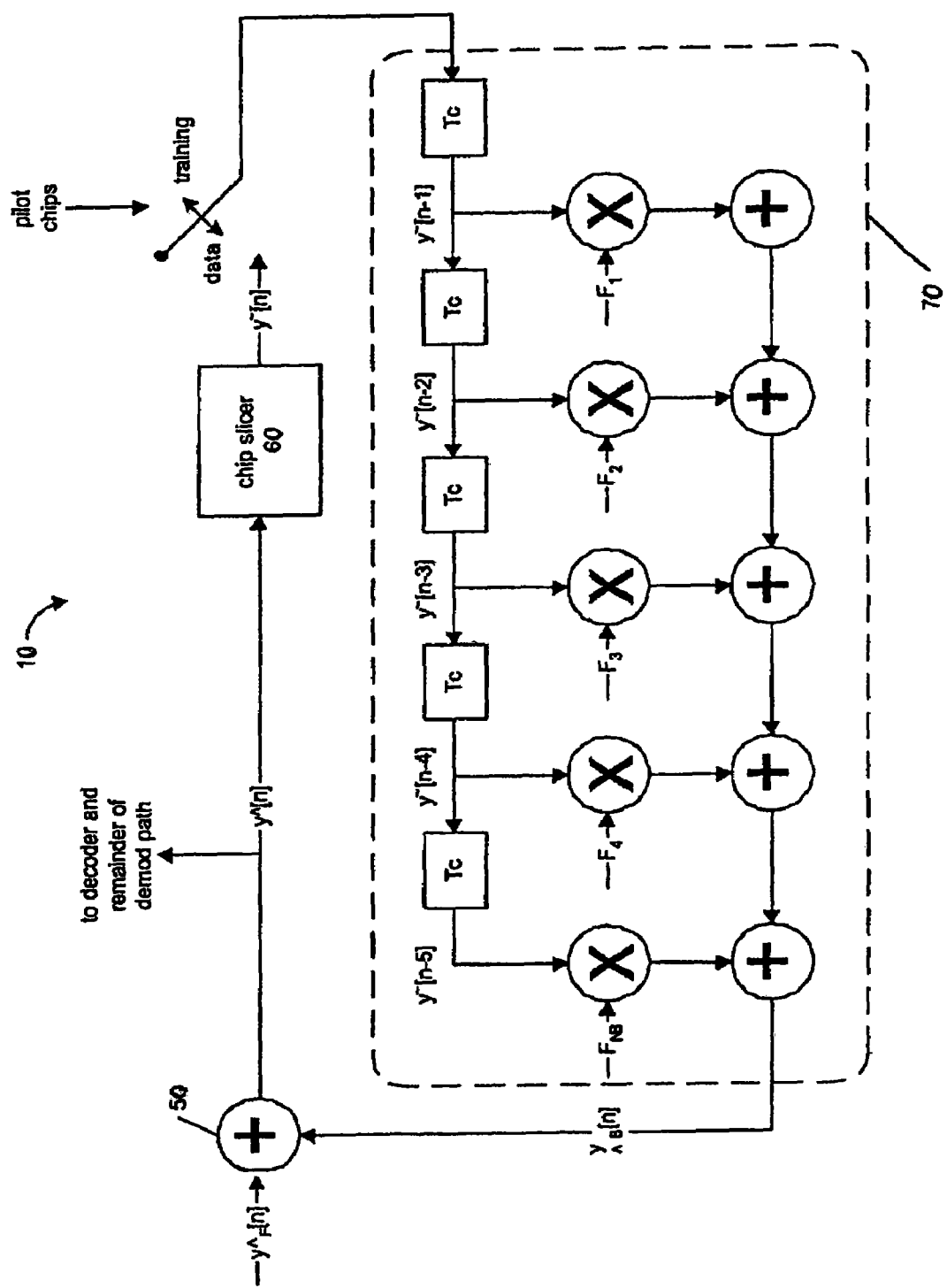
FIG. 4 is a block diagram illustrating an example chip slicer and feedback filter contents in a decision feedback equalizer according to an embodiment of the present invention.

FIG. 4 is a block diagram illustrating an example chip slicer 60 and feedback filter contents 70 in a decision feedback equalizer 10 according to an embodiment of the present invention. In the illustrated embodiment, the DFE 10 comprises a signal combiner 50, a chip slicer 60, and feed back filter 70. The feed back filter 70 comprises a series of tap contents that each contain decisions from the slicer 60. Each set of tap contents is shown as "Tc" in FIG. 4. Advantageously, the DFE 10 can be switched so that the tap contents in the feed back filter 70 are updated only during the data portion of a frame.

For certain block coded digital communication systems, for example, the IEEE 802.11b 5.5 Mb/s data rate system that uses CCK code words, the effects of DFE error propagation can be reduced by improving the reliability of slicer decisions that are stored in the tap contents of the feed back filter 70. In one embodiment, chips 3, 4, 7, and 8 of each CCK code word are known to contain more reliable information. Thus, these slicer decisions can be selectively fed back into the slicer 60 to improve the reliability of future slicer decisions.

Additionally, once the slicer 60 has provided more reliable information, this information can be stored in the tap contents of the feed back filter 70 and the known correlation between the chips in the code word can be exploited to modify the older tap contents in the feed back filter 70 based on the more reliable information. For example, after slicing each of the chips 3, 4, 7, and 8 and placing them into the first tap contents of the feed back filter 70, the tap contents of the feed back filter 70 that is two chips old can be replaced with a more reliable value by modifying the third tap contents of the feed back filter 70. The tap contents are appropriately mixed and combined to create the new estimate to be fed to the chip slicer 60. Advantageously, after startup this ensures that the contents of feed back filter 70 taps 3 and higher will reflect the increased accuracy of the modified slicer input and thereby decrease DFE error propagation.

For example, as k loops from 1 to 8 to represent the CCK chip index of the frame chip index n, the DFE may implement:

If k=3, $y^-[n-3]=y^-[n-1]$.
If k=4, $y^-[n-3]=-y^-[n-1]$.
If k=7, $y^-[n-3]=-y^-[n-1]$.
If k=8, $y^-[n-3]=y^-[n-1]$.

Thus, as k loops from 1 to 8, the sample that is two chips old is modified pursuant to the correlation properties of the CCK code words as previously described in the CCKchip equations. After several chips have been processed, the majority of the tap contents in feed back filter 70 will advantageously be based on the more accurate slicer input.

Accordingly, FIG. 5 is a table diagram illustrating improved feedback filter contents according to an embodiment of the present invention. In the illustrated embodiment, the third and higher feed back filter tap contents reflect the improved accuracy of the chip estimates pursuant to the correlation between chips in the 8 chip CCK code words as previously described. Additionally, in the illustrated table, each row corresponds to a particular time index with time moving from top to bottom. Thus, the contents of feed back filter tap 9 are not modified until after the ninth row.

FIGS. 6A-6C are example code sections in pseudo code that illustrate methods for improving slicer output, using the improved slicer output in various filters, and storing the improved slicer output in a feedback filter to decrease the effects of DFE error propagation. Specifically, FIG. 6A is an example pseudo code listing for creating more accurate sliced chips for least mean square and feed back filter tracking according to an embodiment of the present invention. Moreover, FIG. 6B is an example pseudo code listing for using more accurate sliced chips for better least mean square updating of a decision feedback equalizer, feed forward filter, and feed back filter according to an embodiment of the present invention. Furthermore, FIG. 6C is an example pseudo code listing for using the more accurate sliced chips for improved feed back filter contents according to an embodiment of the present invention.

While the particular embodiment herein shown and described in detail is fully capable of attaining the above described objects of this invention, it is to be understood that the description and drawings presented herein represent a presently preferred embodiment of the invention and are therefore representative of the subject matter which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for improved digital communications, comprising:

receiving a frame in a digital communication stream, the frame having a training portion and a data portion, wherein the data portion comprises an encoded symbol, the encoded symbol having a plurality of Complementary Code Keying (CCK) code words, wherein each code word has a plurality of chips;

slicing a chip from the encoded symbol;

removing interference from the sliced chip;

modifying a previous chip slice decision based on the sliced chip and a correlation among the plurality of chips in a code word;

deriving a more accurate estimate for the sliced chip based on the removing, modifying and a correlation among the plurality of chips in the code word; and estimating the encoded symbol based on the more accurate estimate for the slice chip.

2. The method of claim 1, wherein the receiving step further comprises receiving the encoded symbol during the data portion of a frame.

3. The method of claim 1, further comprising deriving more accurate sliced chip estimates for the plurality of chips in the code word, wherein at least fifty percent of the more accurate sliced chip estimates are based on the correlation among the chips in the code word.

4. The method of claim 1, further comprising:

providing the more accurate estimate for the sliced chip to a feedback filter; and storing the more accurate estimate for the sliced chip in the feedback filter.

5. The method of claim 4, wherein the removing step further comprises combining an output of the feedback filter with the encoded symbol for improved performance in removing interference from the sliced chip.

6. The method of claim 4, wherein at least fifty percent of estimates stored in the feedback filter comprise more accurate estimates of sliced chips from the encoded symbol.

7. A system for improved digital communications, comprising:

a chip slicer for extracting a chip from a code word, the code word received as part of an encoded symbol in a digital communication stream;

a feed back filter configured to determine a noise component based in part on one or more chip slicer decisions output from the chip slicer, the feedback filter having a plurality of content registers, each of the content registers configured to store a chip slicer decision wherein a content register storing a previous chip slicer decision is modified based on a correlation of chips in the code word; and a chip combiner configured to derive a more accurate symbol estimate based on the noise component from the feed back filter, wherein the chip combiner provides improved symbol estimates to the chip slicer.

8. The system of claim 7, wherein one or more content registers are updated with more accurate chip slicer decisions during decision directed updating.

9. The system of claim 8, wherein a majority of the plurality of content registers contain chip slicer decisions determined based on correlation among chips in the code word.

10. The system of claim 7, wherein the feedback filter comprises a finite impulse response ("FIR") filter, and wherein the chip combiner subtracts out postcursor intersymbol interference from a current chip slicer input signal.

11. The system of claim 7, wherein the chip combiner derives the more accurate symbol estimate based on a correlation among the chips in the code word.

12. A receiver for use in a block coded digital communications system, comprising:

a preprocessor for carrying out signal processing tasks and for providing a feed forward filter with baseband samples;

the feed forward filter for processing the baseband samples and for sending a digital data stream to a chip slicer in combination with any signal added or subtracted by a chip combiner, the chip slicer configured to determine a chip slicer output based on a chip combiner output; and a feedback filter for processing previous chip slicer outputs and derive a noise component, and provide the noise component to the chip combiner to subtract interference from the current input to the chip slicer, wherein a content register in the feedback filter storing a previous chip slicer decision is modified based on a correlation of chips in the code word.

13. The receiver of claim 12, wherein coefficients for the feed forward filter and the feedback filter are selected based on minimum mean square error (MMSE) criterion using either adaptive techniques or based on computations involving a channel estimate.

14. The receiver of claim 12, wherein the chip slicer is configured to extract a portion of the data stream that corresponds to a single chip.

15. The receiver of claim 12, wherein the feedback filter feeds the noise component back into the chip slicer by way of the chip combiner so that the noise component is subtracted from the next incoming signal from the feed forward filter before the next incoming signal is fed into the chip slicer.

16. A receiver for use in a block coded digital communications system, comprising:

means for receiving a frame in a digital communications stream, the frame having a training portion and a data portion, wherein the data portion comprises an encoded symbol, the encoded symbol having a plurality of code words, wherein each code word has a plurality of chips;

means for slicing a chip from the encoded symbol;

means for removing interference from the sliced chip based on the sliced chip and a previous sliced chip modified based on a correlation of the sliced chip with the previous sliced chip;

means for deriving a more accurate estimate for the sliced chip based on the removing and a correlation among the chips in a code word; and means for providing the more accurate symbol estimate as input to the means for slicing the chip.

17. The receiver of claim 16, wherein the means for slicing the chip from the encoded symbol comprises a chip slicer for extracting the chip from the code word.

18. The receiver of claim 17, wherein the means for removing interference from the chip comprises a feed back filter configured to determine a noise component based in part on one or more sliced chips, the feed back filter having a plurality of content registers.

19. The receiver of claim 18, wherein the means for deriving the more accurate symbol estimate for the sliced chip based on a correlation among the chips in the code word comprises a chip combiner configured to derive the more accurate symbol estimate for the sliced chip, and wherein the chip combiner provides improved symbol estimates to the means for slicing the chip.

20. A method for improved digital communications, the method comprising:

receiving an encoded symbol stream having a plurality of code words, wherein each code word has a plurality of chips;

slicing a chip from the encoded symbol stream;

determining a sliced chip decision;

modifying a previous sliced chip decision based in part on a correlation among the plurality of chips in the codeword;

determining a noise component based at least in part on the sliced chip and the modified previous chip decision; and combining the noise estimate with a subsequent chip from the encoded symbol stream.

21. The method of claim 20, wherein the code words comprise complementary code keying code words.

22. A system for improved digital communications, the system comprising:

a chip slicer configured to receive an encoded signal stream having a plurality of code words, wherein each code word has a plurality of chips, the chip slicer configured to extract a chip slice from the encoded signal stream and output a chip slicer decision;

a feedback filter comprising a plurality of content registers and configured to receive the chip slicer decision from the chip slicer and determine a noise component based in part on the chip slicer decision, and wherein a content register of the feedback filter is modified based on a correlation between chips of the code word; and a combiner configured to receive a digital communications stream at a first input, the noise component from the feedback filter at a second input, and configured to combine the digital communications stream with the noise component and output the encoded signal stream.

23. A system for improved digital communications, the system comprising:

a chip slicer configured to receive an encoded signal stream having a plurality of Complementary Code Keying (CCK) code words, wherein each code word has a plurality of chips, the chip slicer configured to extract a chip slice from the encoded signal stream and output a chip slicer decision;

a feedback filter comprising a plurality of content registers and configured to receive the chip slicer decision from the chip slicer and store the chip slicer decision in a content register, and wherein a content register storing a previous chip slicer decision is modified based on the chip slicer decision and a correlation of chips in the CCK code words, the feedback filter configured to output a noise component; and a combiner configured to combine the noise component with a digital data stream and output the encoded signal stream.

* * * * *